United States Patent
Lindell

(10) Patent No.: US 10,530,585 B2
(45) Date of Patent: Jan. 7, 2020

(54) DIGITAL SIGNING BY UTILIZING MULTIPLE DISTINCT SIGNING KEYS, DISTRIBUTED BETWEEN TWO PARTIES

(71) Applicant: Bar-Ilan University

(72) Inventor: Yehuda Lindell, Givat Shmuel (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 242 days.

(21) Appl. No.: 15/727,768

(22) Filed: Oct. 9, 2017

(65) Prior Publication Data

US 2018/0359097 A1 Dec. 13, 2018

Related U.S. Application Data

(60) Provisional application No. 62/516,113, filed on Jun. 7, 2017.

(51) Int. Cl.
| | |
|---|---|
| *H04L 9/32* | (2006.01) |
| *H04L 9/06* | (2006.01) |
| *H04L 9/30* | (2006.01) |
| *H04L 9/14* | (2006.01) |

(52) U.S. Cl.
CPC .......... *H04L 9/3247* (2013.01); *H04L 9/0637* (2013.01); *H04L 9/14* (2013.01); *H04L 9/3066* (2013.01)

(58) Field of Classification Search
CPC ..... H04L 9/3247; H04L 9/008; H04L 9/3252; H04L 9/3066; H04L 9/14; H04L 9/0637
See application file for complete search history.

(56) References Cited

U.S. PATENT DOCUMENTS

| | | | |
|---|---|---|---|
| 2016/0105414 A1* | 4/2016 | Bringer | H04L 63/083 713/176 |
| 2017/0155628 A1* | 6/2017 | Rohloff | H04L 9/30 |
| 2019/0052458 A1* | 2/2019 | Wright | H04L 9/008 |

OTHER PUBLICATIONS

S. Goldfeder, R. Gennaro, H. Kalodner, J. Bonneau, E. W. Felten, J. A. Kroll, and A. Narayanan. Securing bitcoin wallets via a new DSA/ECDSA threshold signature scheme, 2014.*
R. Gennaro, S. Goldfeder, and A. Narayanan, "Threshold-optimal DSA/ECDSA signatures and an application to Bitcoin wallet security," Cryptology ePrint Archive, Report 2016/013, 2016, http://eprint.iacr.org/ 2016/013.*

* cited by examiner

*Primary Examiner* — Lynn D Feild
*Assistant Examiner* — Vadim Savenkov
(74) *Attorney, Agent, or Firm* — Alphapatent Associates, Ltd; Daniel J. Swirsky

(57) ABSTRACT

Described herein is a method and system for digital signing by utilizing Elliptic Curve Digital Signature Algorithm (ECDSA) with a group generator of an elliptic-curve group of order q, and an elliptic curve point Q. The method may be configured to receive a digital message and associated with a request from a third-party in order to sign the digital message. The system designed to sign such messages may comprise two parties denoted $P_1$ and $P_2$ configured to conduct a multiparty signing procedure by utilizing ECDSA. The digital signing procedure may follow preliminary steps configured to set the system with the necessary conditions for the multiparty signing procedure. Such preliminary steps may set the parties $P_1$, and $P_2$, in accordance with the configuration defined herein.

9 Claims, 5 Drawing Sheets

DIGITAL SIGNING BY UTILIZING MULTIPLE DISTINCT SIGNING KEYS, DISTRIBUTED BETWEEN TWO PARTIES

CROSS REFERENCE TO RELATED APPLICATIONS

This application claims priority to U.S. Provisional Patent Application Ser. No. 62/516,113 filed Jun. 7, 2017, which is hereby incorporated herein by reference in its entirety and for all purposes.

FIELD OF THE INVENTION

The invention generally relates to the field of cryptography and digital signing processes, more specifically to the usage of Elliptic Curve Digital Signature Algorithm for multiparty digital signing.

BACKGROUND OF THE INVENTION

Threshold cryptography can be used where multiple signatures are needed to generate a signature, and likewise where highly confidential documents should only be decrypted and viewed by a quorum. Furthermore, threshold cryptography can be used to provide a high level of key protection. This is achieved by sharing the key on multiple devices (or between multiple users) and carrying out private-key operations via a secure protocol that reveals nothing but the output. This provides key protection since an adversary needs to breach multiple devices in order to obtain the key. Threshold cryptography is of practical use, as can be seen by the fact that a number of startup companies are now deploying threshold cryptography for the purpose of key protection. One example use is due to the fact that Elliptic Curve Digital Signature Algorithm (ECDSA) signing is used in Bitcoin, and the theft of a signing key can be immediately translated into concrete financial loss. Bitcoin has a multi-signature solution built in, which is based on using multiple distinct signing keys rather than a threshold signing scheme. Nevertheless, a more general solution is obtained via threshold cryptography. Fast threshold cryptography protocols exist for a wide variety of problems, including RSA signing and decryption, ElGamal and ECIES encryption, Schnorr signatures, Cramer-Shoup, and more. Despite being a widely-used standard, DSA/ECDSA with distributed key shares has resisted attempts at constructing efficient protocols for threshold signing. This is due to the difficulties to calculate the curve points $x_1$ and $y_1$ without knowing the parameter k utilized to calculate the points with G, the generator of the elliptic curve.

SUMMARY OF THE INVENTION

The present invention discloses a method and system for digital signing by utilizing ECDSA with a group generator of an elliptic-curve group of order q, and an elliptic curve point Q. The method disclosed in the present invention can be configure to receive a digital message and associated with a request from a third-party in order to sign the digital message. The system designed to sign such messages may comprise two parties denoted $P_1$ and $P_2$ configured to conduct a multiparty signing procedure by utilizing ECDSA. The digital signing procedure may follow some preliminary steps configured to set the system with the necessary conditions for the multiparty signing procedure. Such preliminary steps may set the parties $P_1$, and $P_2$, with the following configuration:

$P_1$ may hold a first random share set to compute a first point on said elliptic curve, an elliptic curve point Q on the elliptic curve, a public key and a private key of an additively homomorphic encryption scheme, and a group generator of an elliptic-curve group of order q to compute elliptic curve points.

P2 may hold: a second random share, set to generate a second point on said elliptic curve, said elliptic curve point Q on said elliptic curve, said public key, and a ciphertext created by encrypting said first random share with said public key, group generator of an elliptic-curve group of order q to compute elliptic curve points.

The parties $P_1$ and $P_2$ may also be configured to perform the preliminary steps configured to set the system wherein, the first random share was not exposed to $P_2$ in a nonencrypted format during the signing process, and the second random share was not exposed to $P_1$ in a nonencrypted format during the signing process. In some case, $P_1$ and $P_2$ may also be configured to creating a hash value of the digital message with one hash function by $P_1$, and creating a hash value of the digital message with said one hash function by $P_2$.

According to possible embodiments of the present invention, once the message and the request are received from a third party, the parties P1 and P2 which may be configured according to the preliminary steps, may conduct the digital signing procedure by performing the following: $P_1$ can choose a random value $K_1$, and utilize the group generator and the random value $K_1$ to compute an elliptic curve point $R_1$ on the elliptic. Then $P_1$ can send the elliptic curve point $R_1$ to $P_2$. Similarly, $P_2$ can choose a random value $K_2$ and utilizes the group generator and the random value $K_2$ to compute an elliptic curve point $R_2$ on the elliptic. Then, $P_2$ can utilize $R_1$ and $K_2$ to compute an elliptic curve point R on said elliptic curve. Then, $P_2$ can choose a random value and utilize an additive homomorphic scheme with the public key to computes a value C which may comprise: the hash value of the digital message, first random share, second random share, $k_1$, $k_2$ and the random value, wherein value C is encrypted with said public key. After the encryption of the value C, $P_2$ can send the encrypted value C to $P_1$. Then, $P_1$ can decrypt the encrypted value C with the private key, and then, utilize the content in value C, the elliptic curve point $R_1$, and the random value $K_1$ to produce a digital signature of the digital message. Once the digital signature of the digital message is computed, $P_1$ can send it to the third-party who requested the signing procedure.

The system disclosed in the present invention may comprises two parties configured to receive requests for digital signing procedures. The requests for digital. signing may arrive to the system from third-party entities, such as servers operating overt the internet, computerize device configured to provide such requests, and the like. In some cases, the parties $P_1$ and $P_2$ may comprise software application for managing the cryptographic processes in the system. In some embodiments of the present invention the parties $P_1$ and $P_2$. may be configured with a key storage media designed to store keys, secrets utilized in the security process, key shares, and the like.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method and system for multiparty digital signing by utilizing Elliptic Curve Digital Signature Algorithm (ECDSA) based on signing keys, distributed between two parties, denoted as $P_1$ and $P_2$. The method and system disclosed in the present invention may be configured to conduct a multiparty signing procedure with preliminary steps comprising: a step for choosing random shares between two parties $P_1$ and $P_2$ ensuring that they behave honestly, and a step for generating the distributed signing keys between $P_1$ and $P_2$. The preliminary steps may be conducted by the parties $P_1$ and $P_2$, wherein said parties utilize a zero-knowledge proof of a knowledge of the shares the parties hold. The parties $P_1$ and $P_2$ can be configured to generate an elliptic curve point Q such that Q=x·G, wherein G is the generator point of an Elliptic-curve group of order q. In some cases, the computations performed by P1 and P2 in the method disclosed at the present invention may utilize operators that are homomorphic properties provided by the encryption scheme, which are known to a person who has ordinary skills in the art.

Figure 1A:
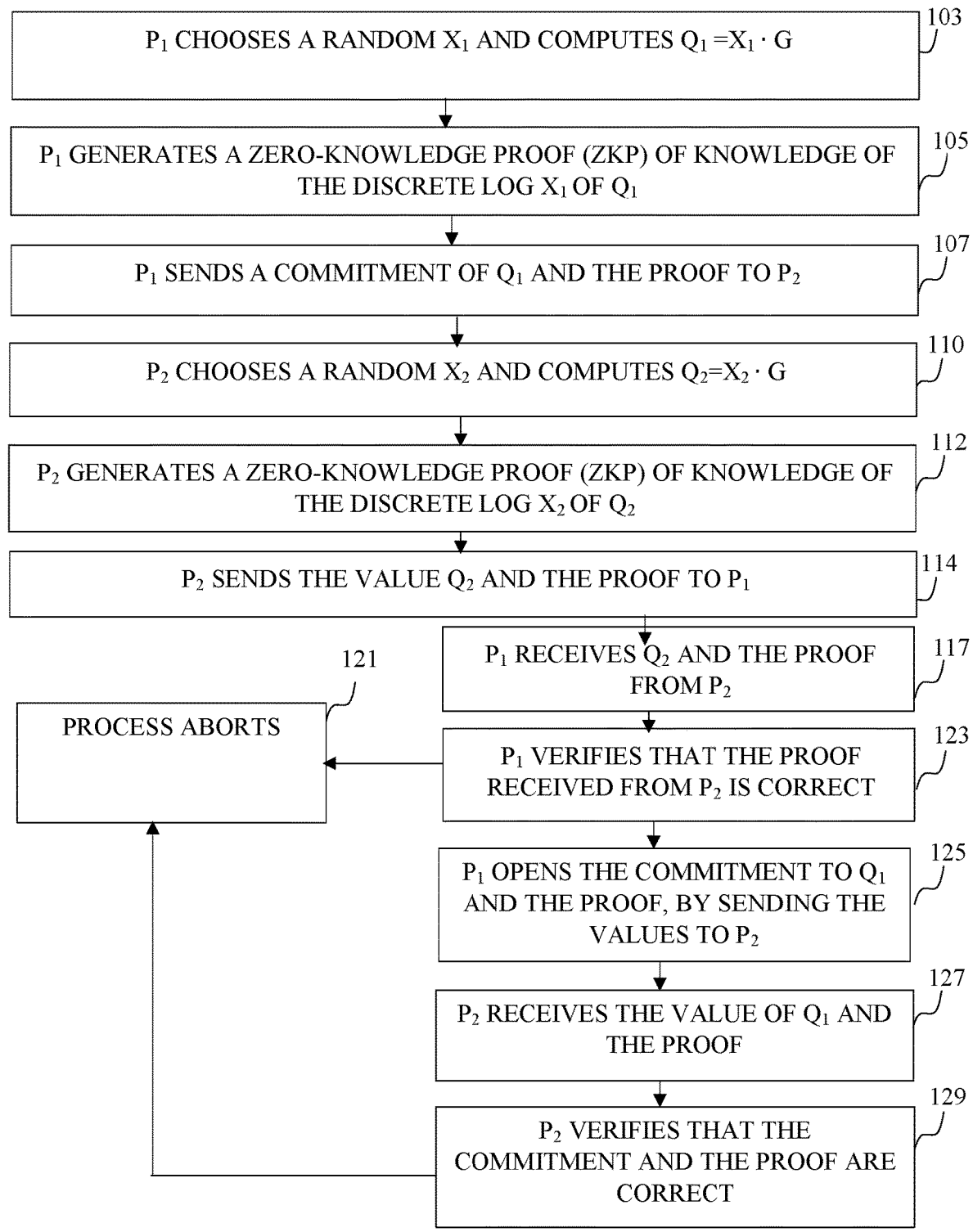
FIG. 1A discloses a method denoted KeyGen_1 for choosing random shares between two parties $P_1$ and $P_2$ and verifying that $P_1$ and $P_2$ behave honestly, according to exemplary embodiments of the present invention.

FIG. 1A discloses a method denoted KeyGen_1 for choosing random shares between two parties $P_1$ and $P_2$ and verifying that $P_1$ and $P_2$ behave honestly, according to exemplary embodiments of the present invention. In step 103 $P_1$ chooses a random $x_1 \leftarrow Z_q$ and computes $Q_1 = x_1 \cdot G$, where G is the generator point of an Elliptic-curve group of order q, and $Z_q$ is defined as the multiplicative group of integers modulo q. In step 105 $P_1$ generates a zero-knowledge proof (denoted as ZKP) of knowledge of the Discrete Log of $Q_1$ which is equal to $x_1$. In some embodiments of the present invention, the parties P1 and P2 may utilize a non-interactive zero-knowledge proof which requires a proof generation performed by one party such as $P_1$, or $P_2$, and verification performed by the other party. In some other cases, the parties may utilize an interactive zero-knowledge proof. In some cases, this zero-knowledge proof may be the Schnorr protocol, known to a person who has ordinary skills in the art. In step 107 $P_1$ sends $P_2$ a commitment of $Q_1$ and the proof. The proof may be the proof resultant in step 105 above. In some cases, the commitment sent by $P_1$ may be a non-interactive commitment given by one party to the other. For example, such a commitment can be the hash value resultant on $Q_1$ and the proof, and a random string generated or received by $P_1$. Such a commitment is opened by $P_1$ sending $Q_1$ and the proof and the random string to $P_2$, and $P_2$ can verify that the commitment was correct by re-computing the hash and comparing to the commitment hash value. In step 110 $P_2$ chooses a random $x_2 \leftarrow Z_q$ and computes $Q_2 = x_2 \cdot G$, where G is the generator point of an Elliptic-curve group of order q. In step 112 $P_2$ generates a ZKP of knowledge of the Discrete Log of $Q_2$ which is equal to $x_2$. In step 114 $P_2$ sends to $P_1$ the value $Q_2$ and the proof resultant in step 112 above. In step 117 $P_1$ receives the proof from $P_2$. In step 123 $P_1$ verifies that the proof received from $P_2$ is correct using the verification procedure specified for the proof. Such verification procedures can be defined by a person who has ordinary skills in the art. In case the proof is not correct, $P_1$ performs step 121 and aborts. In other cases, $P_1$ can continue to step 125 of the method and open the commitment to $Q_1$ and the proof. If the commitment is computed as described above as a hash value, then it is opened by sending $Q_1$ and the proof and the random string to $P_2$. In step 127 $P_2$ receives the value $Q_1$ and the proof. In step 129 $P_2$ verifies that the proof of the ZKP associated with $Q_1$ is correct, and that the commitment is correct. Thus, in case either the proof or the commitment are not corrected, $P_2$ performs the step 121 of the method and aborts.

Figure 1B:
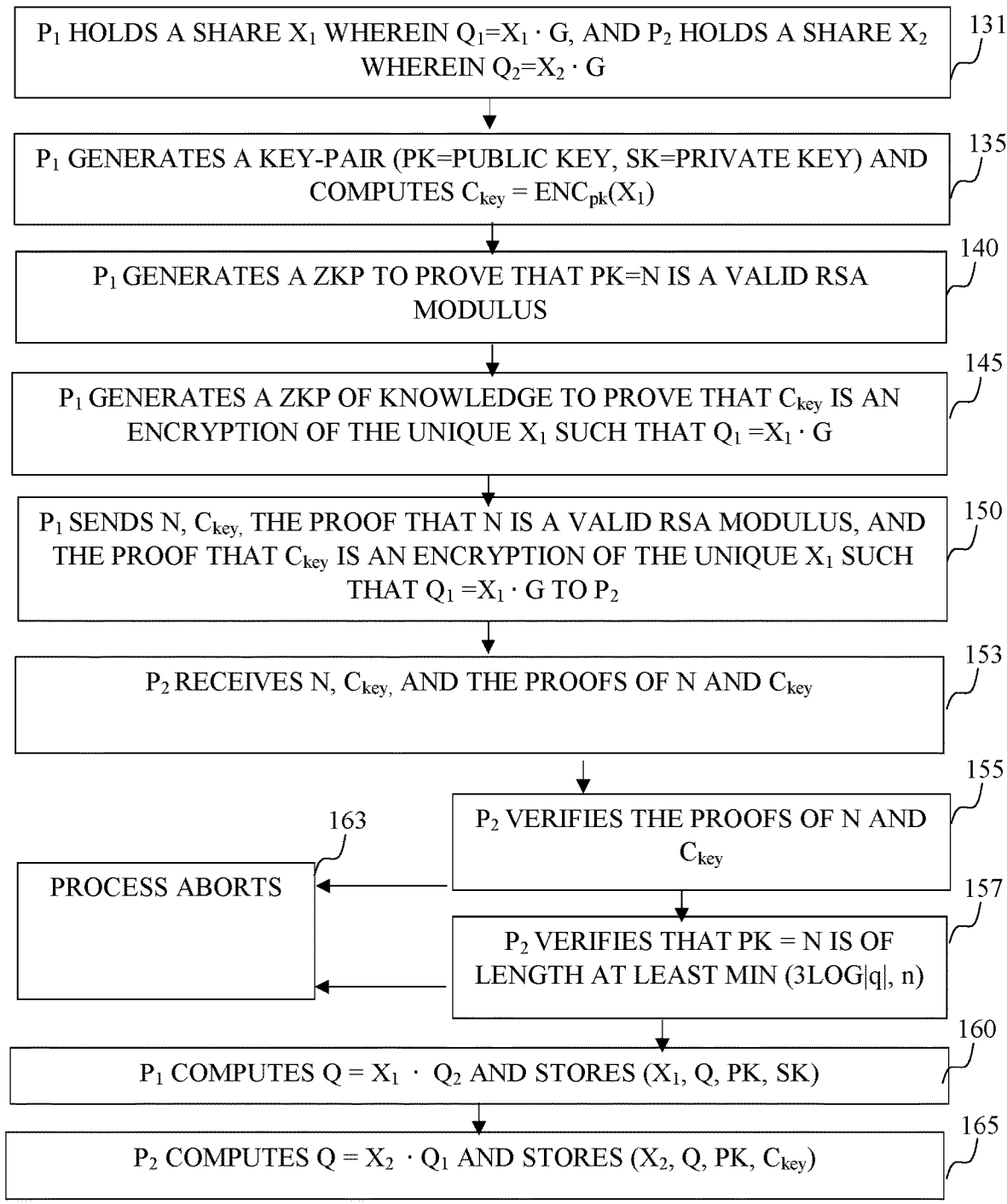
FIG. 1B discloses a method denoted KeyGen_2 for generating a distributed key between two parties $P_1$ and $P_2$ under the assumption that one of $P_1$ and $P_2$ may behave dishonestly, using the random shares generated in KeyGen_1, by using an additively homomorphic encryption scheme, according to the exemplary embodiments of the present invention.

FIG. 1B discloses a method denoted KeyGen_2 for generating a distributed key between two honest parties $P_1$ and $P_2$, using the random shares generated in KeyGen_1, by using an additively homomorphic encryption scheme, according to the exemplary embodiments of the present invention. In step 131 $P_1$ holds a share $x_1$ in $Z_q$ where $Q_1 = x_1 \cdot G$ and G is the generator point of an Elliptic-curve group Q of order q. $P_2$ also holds a share $x_2$ in $Z_q$ where $Q_2 = x_2 \cdot G$ and G is the generator point of the same Elliptic-curve group Q of order q. In step 135 $P_1$ generates a public key denoted pk and a private key denoted sk for the public key of an additively homomorphic encryption scheme. The homomorphic encryption scheme may support addition of ciphertexts and multiplication by a scalar. The additively homomorphic encryption scheme can be used by any implementation of additively homomorphic encryption scheme known to a person who has ordinary skills in the art. Such an exemplary implementation may be an implementation of lattice-based schemes, such as Regev's implementation of lattice-based schemes. In some cases, the Paillier encryption scheme can be used for the same purpose.

Figure 2:
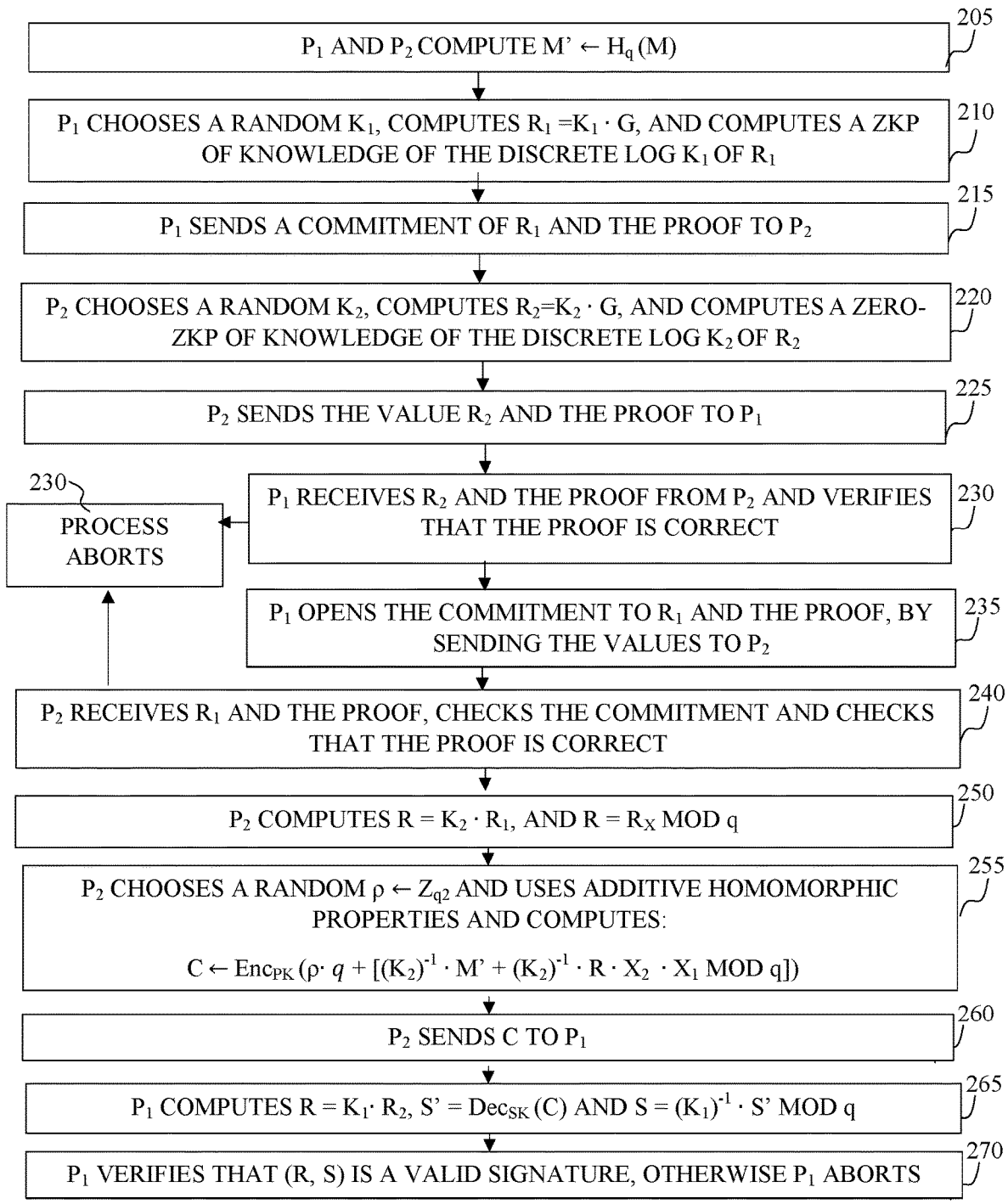
FIG. 2 discloses a procedure denoted Sign(M) for digital signing by utilizing a key distributed between two parties $P_1$ and $P_2$, under the assumption that one of $P_1$ and $P_2$ may behave dishonestly, according to exemplary embodiments of the present invention.

Once $P_1$ holds the public key pk, a parameter denoted $C_{key}$ can be computed such that $C_{key} = Enc_{pk}(x_1)$, wherein $Enc_{pk}()$ is the encryption process utilizing the public key pk. In step 140 $P_1$ generates a ZKP to prove that N, defined as N=pk is a valid RSA modulus which is also a proof that the public key pk was correctly generated. In step 145 $P_1$ generates a ZKP of knowledge to prove that $C_{key}$ is an encryption of the unique $x_1$ such that $Q_1 = x_1 \cdot G$. Such zero-knowledge proofs can be designed using standard techniques known to any person who has ordinary skills in the art. In step 150 $P_1$ sends the proof resultant of the process in step 140 which proved that N is a valid RSA modulus, and the proof resultant of the process in step 145 which proved that $C_{key}$ is an encryption of the unique $x_1$ such that $Q_1 = x_1 \cdot G$, to $P_2$. In step 153 $P_2$ receives the proofs sent at step 153. In step 155 P2 verifies the proofs received in step 153 according to the specified verification technique of the proof. In case the verification fails, $P_2$ aborts. In step 157 $P_2$ verifies that the public key pk =N is of length at least min (3log|q|, n), where q is the order of the Elliptic curve group, and n denotes the standard recommended length of RSA public keys, and in case the verification fails, the process aborts. In step 160 $P_1$ computes $Q=x_1 \cdot Q_2$ and stores $(x_1, Q)$ and stores $(x_1, Q, pk, sk)$, and in step 165 $P_2$ computes $Q=x_2 \cdot Q_1$ and stores $(x_1, Q, C_{key})$, FIG. 2 discloses a procedure denoted Sign(M) for digital signing by utilizing a key distributed between two parties, $P_1$ and $P_2$, under the assumption that one of $P_1$ and $P_2$ may behave dishonestly, according to exemplary embodiments of the present invention. In step 205 a message for signing is prepared by a computerized application. Such an application may be operated by one of the parties, which may require to sign a digital message or document. In such a case, $P_1$ and $P_2$ compute: $M' \leftarrow H_q(M)$. In some cases, the $H_q()$ may be a hash function known to both parties $P_1$ and $P_2$, where $H_q$ maps strings of arbitrary length to $Z_q$.

In step 210 $P_1$ chooses a random $k_1$, computes $R_1 = k_1 \cdot G$ and then computes a ZKP of knowledge of the Discrete Log $k_1$ of $R_1$. In step 215 $P_1$ sends a commitment of $R_1$ and the proof to $P_2$. Such a commitment may be the hash of the value, the proof and a random string, as described above. In step 220 $P_2$ chooses a random $k_2$, computes $R_2 = k_2 \cdot G$ and then computes a ZKP of knowledge of the Discrete Log $k_2$ of $R_2$. In step 225 $P_2$ sends the value $R_2$ and the proof, which may be the Discrete Log $k_2$ of $R_2$, to $P_1$. In step 230 $P_1$ receives $R_2$ and the proof from $P_2$ and verifies that the Discrete Log of $R_2$ is correct using the specified verification of the proof. In case the proof is not correct, $P_1$ aborts the method. In step 235 $P_1$ opens the commitment to $R_1$ and the proof. For example, if the commitment uses a hash, then $P_1$ sends $R_1$, the proof and the random string. In step 240 $P_2$ receives $R_1$ and the proof, verifies the commitment (by re-computing the hash and comparing) and validates that the proof is correct using the proof verification specification. In step 250 $P_2$ computes $R = k_2 \cdot R_1$ and $r = r_x$ mod q, wherein $R = (r_x, r_y)$ by the Elliptic curve point definition, and q is the order of the Elliptic curve group. In step 255 $P_2$ chooses a random $\rho \leftarrow Z_{q^2}$ and uses the additively homomorphic properties (such as those provided by Paillier encryption or any other additively homomorphic encryption schemes) to compute an encryption defined by $Enc_{pk}$ $(\rho \cdot q + [(k_2)^{-1} \cdot M' + (k_2)^{-1} \cdot R \cdot x_2 \cdot x_1 \bmod q])$. This is computed using $C_{key}$ in the following steps: (1) compute $C_1 \leftarrow Enc_{pk}$ $(\rho \cdot q + [(k_2)^{-1} M' \bmod q])$ using the additively homomorphic encryption scheme, (2) compute $v \leftarrow (k_2)^{-1} \cdot r \cdot x_2 \bmod q$, and $C_2 \leftarrow v \odot C_{key}$ using the homomorphic property of additive encryption that enables multiplication by a scalar, (3) computes $C = C_1 \oplus C_2$ using the homomorphic property of additive encryption that enables the addition of two ciphertexts. In step 260 $P_2$ sends the value C to $P_1$ and then in step 265 $P_1$ computes $R = k_1 \cdot R_2$, $S' = Dec_{sk}(C)$ and $S = (k_1)^{-1} \cdot S' \bmod q$, wherein $Dec_{sk}()$ is the decryption function utilizes the private key sk for the additively homomorphic public key scheme. In step 270 $P_1$ verifies that (r, s) is a valid signature on message m, using the standard ECDSA signature verification procedure, otherwise $P_1$ aborts.

Figure 3:
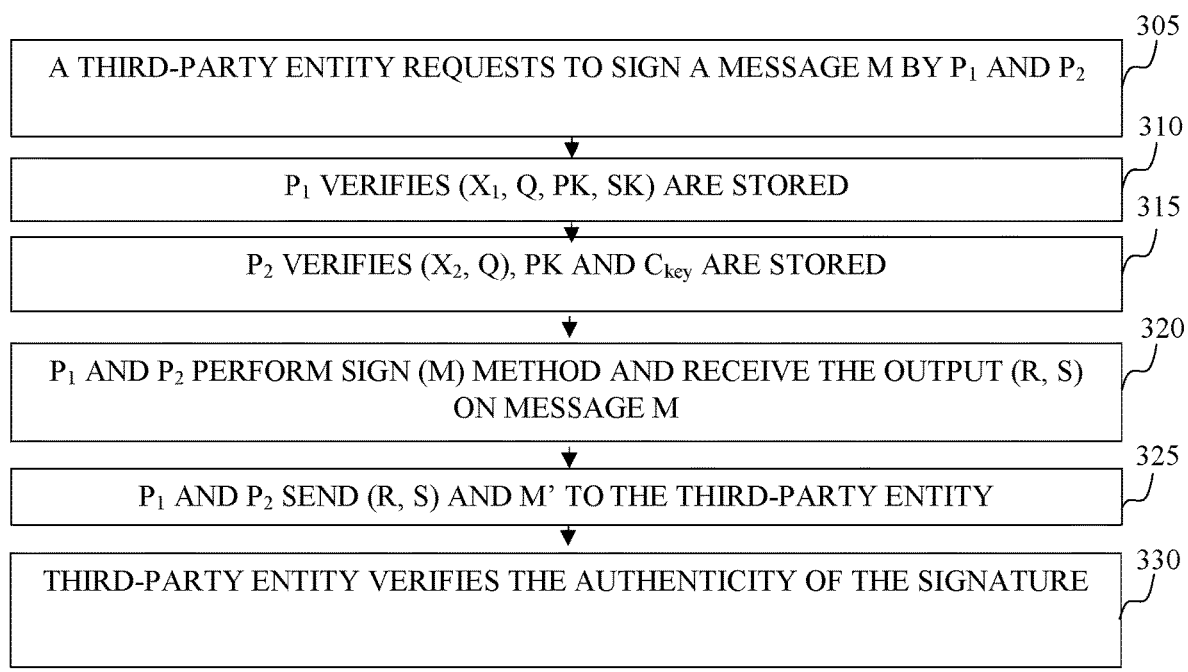
FIG. 3 discloses a method for multiparty digital signing by utilizing ECDSA based on using a signing key distributed between two parties according to exemplary embodiments of the present invention.

FIG. 3 discloses a method for multiparty digital signing by utilizing ECDSA based on using multiple distinct signing keys, distributed between two parties according to exemplary embodiments of the present invention. In step 305 a third-party entity requests to sign a digital message or a document denoted as M, by $P_1$ and $P_2$. In some cases, signing on M may require a digital signing by more than one person, or a joint signature provided by more than one signees. For example, bitcoin transactions or other transactions may require multi-signatures.

$P_1$ and $P_2$ may be computerized devices configured to digitally sign electronic messages or documents. In some cases, such a third-party entity may be a server or other computerized device configured to verify the authenticity of the digital signature associated with a digital message or a document. In some cases, $P_1$ and $P_2$ may be may be computerized devices operated by two different people, which may need to provide multiparty digital signing.

In step 310 $P_1$ verifies that $(x_1, Q, pk, sk)$ are stored according to method KeyGen_2 and message M is received. In some embodiments of the present invention a session ID, denoted as a sid, may be provided by the third-party entity. The provided sid can be an integer number functioning as a counter, a unique string sequence, and the like, which define the multiparty digital signing session. In some cases, $P_1$ and $P_2$ may utilize the sid inside the zero-knowledge proofs to ensure that the sid is unique to the current multiparty digital signing session. In step 315 $P_2$ verifies $(x_2, Q)$, pk and $C_{key}$ are stored according to method KeyGen_2. In step 320 $P_1$ and $P_2$ perform the procedure Sign(M) and receive the ECDSA signature (r, s) on message M. In step 325 $P_1$ and $P_2$ send the signature (r, s) and the message M. In step 330 the third-entity verifies the authenticity of the signature by using a standard ECDSA signature verification procedure. In some cases, the third-party which verifies the authenticity of the signature may be configured to operate a procedure of ECDSA signature verification. For example, the third-party entity may have the public-key on the curve wherein Q is a point at the curve.

Figure 4:
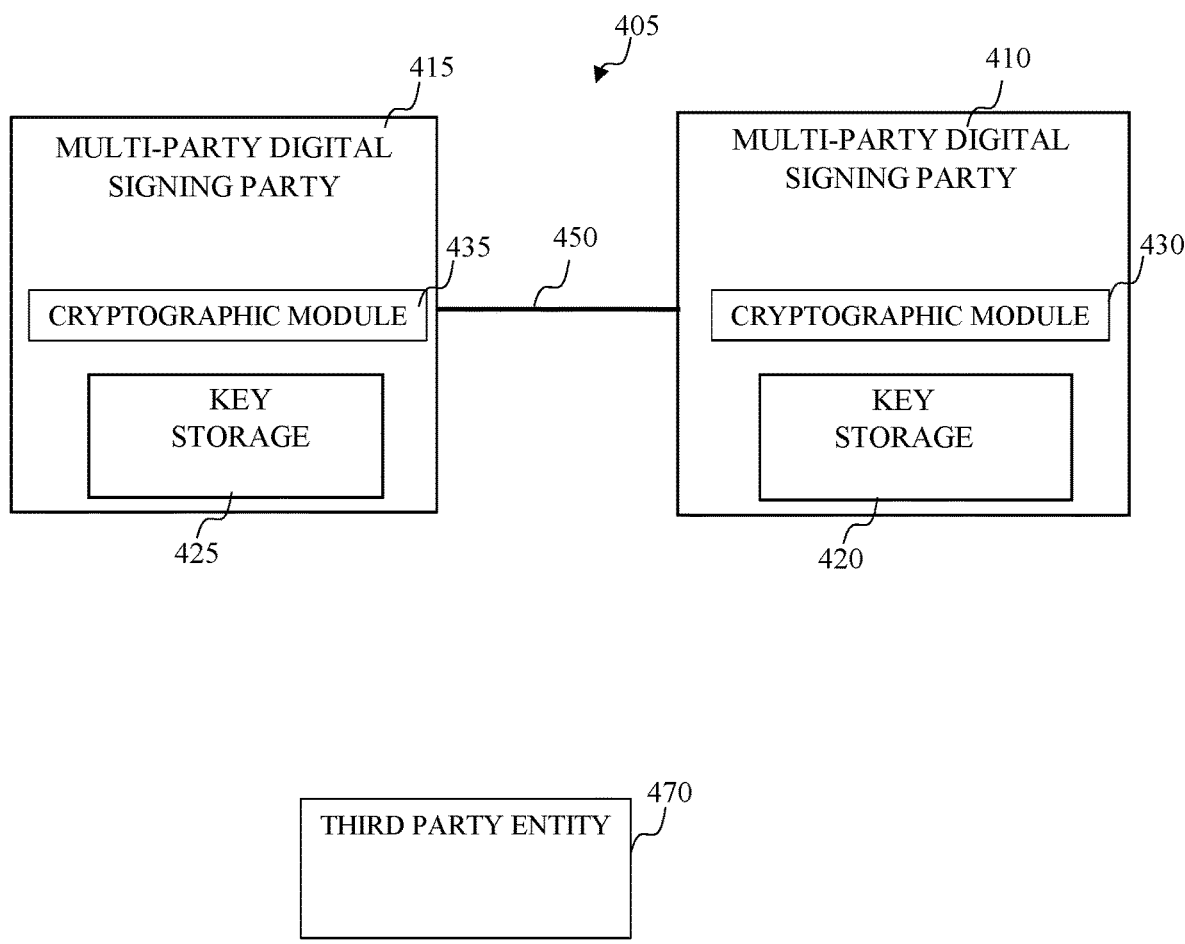
FIG. 4 discloses a system designed to perform a multiparty digital signing by utilizing ECDSA based on using a signing key distributed between two parties, according to exemplary embodiments of the present invention.

FIG. 4 discloses a system designed to perform a multiparty digital signing by utilizing ECDSA based on using one or more shared signing keys distributed between two parties, according to exemplary embodiments of the present invention. FIG. 4 shows a multiparty digital signing system 405 comprising a multiparty digital signing party 415 and a multiparty digital signing party 410. The multiparty digital signing parties 410 and 415 can be computerized devices operated singlehandedly by persons. For example, in some cases, the multiparty digital signing party 415 may be operated by one person and the multiparty digital signing party 410 may be operated by another person. The multiparty digital signing parties 415 and 410 may also have cryptographic modules 435 and 430 respectively. The cryptographic modules 435 and 430 may be configured for processing cryptographic procedures such as an encryption, security algorithms, generating secret shares, signing digital messages or digital documents and the like. The multiparty digital signing parties 415 and 410 can communicate via connection 450 which may be a telecommunication network connection such as an internet protocol based connection, a computer network based connection, and the like. The multiparty digital signing parties 415 and 410 also comprise key storages 425 and 420 respectively configured to store the key shares and the secrets utilized in the digital signing processes. For example, in some cases, the multiparty digital signing party 415 may utilize the key storage 425 to store the $(x_1, Q)$ required at the digital signing process, and the multiparty digital signing party 415 may store the $(x_2, Q)$ required at the same digital signing process. The key storages 425 and 420 may be a data storage device, a magnetic storage such as hard disk, a solid-state storage, other media comprising a non-volatile memory, and the like.

In some cases, one of the parties either multiparty digital signing party 415 or multiparty digital signing party 410 may launch the KeyGen_1 and KeyGen_2 to generate the distributed keys between multiparty digital signing parties 410 and 415. In some cases, the multiparty digital signing party 410 may launch the Sign(M) procedure for signing on a message M, per request provided by the third-party entity 470. In some other cases, the multiparty digital signing party 415 may be the party which launches the Sign(M) procedure for signing on a message M, per request provided by the third-party entity 470. In such cases, the multiparty digital signing party 415 and multiparty digital signing party 410 may utilize the key storage 425 and the key storage 420, respectively to store the cryptographic data. The cryptographic data may be keys, key shares, parameters related to the elliptic-curve computation, numbers, and the likes.

The third-party entity 470 may be a computerize device seeking to receive a message M signed by a person or persons operating the multiparty digital signing parties 410 and 415. In some cases, the message M to sign may be sent by the third-party entity 470 to one of the multiparty digital signing parties 410 or 415. Then, the party received the request to sign the message M may launch the digital signing process and conduct said digital signing process with the third-party entity 470.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for digital signing by utilizing ECDSA with a group generator of an elliptic-curve group of order q, and an elliptic curve point Q, comprising: receiving a digital message and a request from a third-party to sign said digital message by two parties denoted P1 and P2 configured to perform digital signing by utilizing ECDSA, wherein:

(i) P1 holds a first random share set to compute a first point on said elliptic curve, a public key and a private key of an additively homomorphic encryption scheme, the elliptic curve point Q, (ii) P2 holds a second random share, set to generate a second point on said elliptic curve, said public key, and a cipher text created by encrypting said first random share with said public key, the elliptic curve point Q, creating a hash value of the digital message using a hash function applied by P1, and creating a hash value of the digital message with said hash function applied by P2;

performing a digital signing procedure by P1 and P2, wherein said digital signing procedure comprises:

using a random value K1 chosen by P1 to compute an elliptic curve point R1 on said elliptic curve, sending elliptic curve point R1 from P1 to P2, using a random value K2 chosen by P2 to compute an elliptic curve point R2, utilizing elliptic curve point R1 and random value K2 by P2 to compute an elliptic curve point R, using additive homomorphic scheme by P2 to compute a value C, wherein said value C comprising: the hash value of the digital message, first random share, second random share, random value K1, random value K2 and a random value chosen by P2, and wherein value C is encrypted with said public key, sending value C from P2 to P1, decrypting value C with the private key by P1, and utilizing the content in value C to produce a digital signature of the digital message;

sending the digital signature of the digital message and the hash value of the digital message to the third-party.

2. The method of claim 1, wherein the digital message and the request from the third-party also comprise a session ID.

3. The method of claim 1, wherein the first random share is not exposed to P2 in a nonencrypted format during the signing process.

4. The method of claim 1, wherein the second random share was not exposed to P1 in a nonencrypted format during the signing process.

5. The method of claim 1, wherein the hash value is created independently by P1 with the one hash function.

6. The method of claim 1, wherein the hash value is created independently by P2 with the one hash function.

7. The method of claim 1, wherein the digital signature of the digital message is sent by P1.

8. The method of claim 1, wherein the additive homomorphic scheme is based on implementation of lattice-based scheme.

9. The method of claim 1, wherein the additive homomorphic scheme is based on Paillier encryption scheme.

* * * * *